Jan. 10, 1950     S. P. MOYER     2,494,139
FLOTATION OF TITANIUM OXIDE MINERAL CONCENTRATES
Filed Dec. 20, 1945
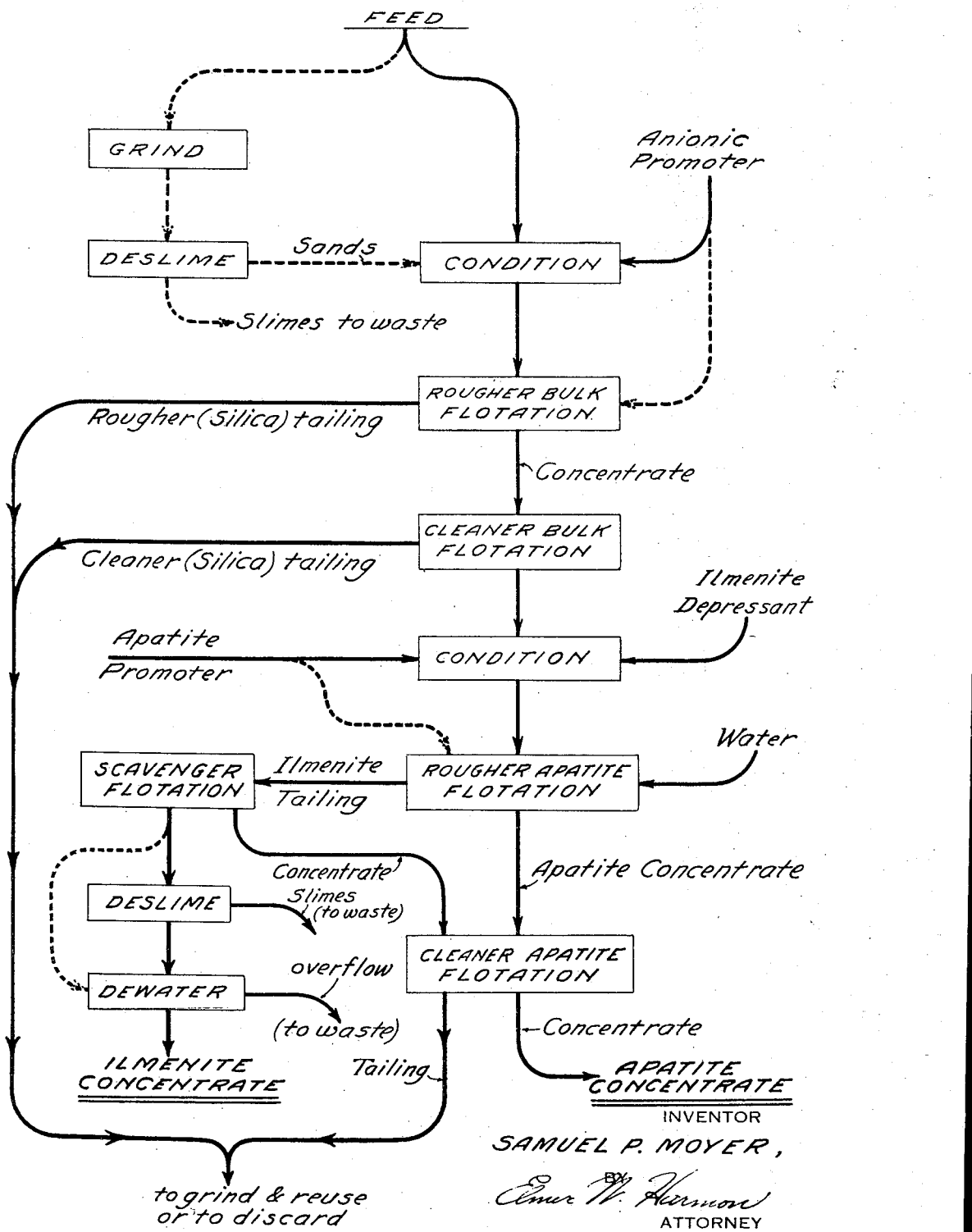
INVENTOR
SAMUEL P. MOYER,
ATTORNEY Patented Jan. 10, 1950

2,494,139

UNITED STATES PATENT OFFICE 2,494,139

FLOTATION OF TITANIUM OXIDE MINERAL CONCENTRATES

Samuel P. Moyer, Greenwich, Conn., assignor to American Cyanamid Company, New York, N. Y., a corporation of Maine Application December 20, 1945, Serial No. 636,199

6 Claims. (Cl. 209—167)

This invention relates to the beneficiation by froth flotation of those metallic oxide ores containing excessive amounts of phosphate minerals. More particularly, it is concerned with the separation of phosphorus-bearing minerals such as apatite from metallic oxide minerals such as ilmenite, rutile, magnetite, hematite and the like.

The typical problems involved as well as their solutions are found in the production of ilmenite concentrates. In commercial practice, the use of titanium oxides has become increasingly important and accordingly the demand for high grade ore from which they may be recovered has steadily increased. Unfortunately, while there are many natural deposits of titanium minerals, the grade of these ores in many cases is not sufficiently high to make recovery of titanium oxides therefrom commercially feasible. Particularly is this true of most deposits within the United States. Therefore, while the process is not limited thereto, the invention will be illustrated by its application to titanium-bearing ores.

Natural deposits of titanium-bearing minerals are usually ores containing, in addition to the ilmenite, rutile or the like, a silica-bearing gangue. Ordinarily, this silica and/or silicate content must be reduced to produce a concentrate meeting commercial standards, for example to be used as raw material for the production of titanium oxide pigments.

In addition to the problems presented by silica and/or silicates, many ores, particularly in the United States, contain a certain amount of phosphorus-bearing minerals. In the illustrative case of ilmentite, this is frequently apatite. The presence of phosphorus is objectionable in a raw material for the production of titanium oxide pigments in various crystal forms such as rutile or anatase. Particularly is this true in the latter case. A commercially-acceptable concentrate must have a low $P_2O_5$ content, usually the specification requiring 0.1% or less. Since the $P_2O_5$ assay may vary from about 1 or 2%, found in ilmenite concentrates obtained from ores which are worked primarily for other constituents, to 12% or more, as found in ilmenite ores such as nelsonite, the reduction of the $P_2O_5$ content is essential. Those processes which in the past have been employed to reduce the silica or silicate content are not effective for this purpose.

Despite the demand therefor, there has been available no process for readily and effectively producing concentrates of metallic oxides such as ilmenite or the like, sufficiently low in $P_2O_5$ content. Neither have the concentrates previously obtainable been wholly satisfactory as to their silica and/or silicate content nor have they been obtainable in a condition in which they can be readily dewatered and dried for further processing.

In general, these desirable results, in accordance with the present invention, are simply and readily accomplished by a novel sequence of operations. Broadly, the process involves two anionic flotations. In the first, a bulk flotation concentrate of the ilmenite an apatite is taken, to free them from the silica and silicates. In the second, the bulk flotation concentrate, after treatment with a depressant for the ilmenite and a promoter for the phosphate, is subjected to flotation to produce a clean phosphate concentrate and a clean ilmenite tailing.

The process is illustrated by the accompanying drawing which comprises a flow sheet delineating the principal steps involved in the process of the present invention.

Although not a part of the present invention, if the feed is a natural ore a careful preparation before flotation is usually found advisable. The ores ordinarily contain considerable quantities of slimes and additional amounts are produced in grinding the ore to flotation feed sizes. Various combinations of crushing or grinding and desliming have been found useful. A preferable procedure has been found to first crush the ore to a fairly coarse size, for example, about minus 10 mesh and then deslime by hydraulic classification or by screening, whereby the bulk of the slimes is eliminated. The resultant sands are then ground to suitable size for froth flotation feed, normally about minus 65 mesh, and then deslimed again. Other procedures may be used if so desired. In addition, grinding in the presence of a dispersing agent such as an alkali, a soluble alkali silicate or the like usually speeds up and simplifies the desliming operation.

In obtaining the bulk concentrate, the deslimed ore is subjected to flotation with an anionic type promoter. This may be any one of several types; a fatty acid such as oleic acid, fish-oil fatty acids, coconut-oil fatty acids and the like; resin or naphthenic acids; mixtures of resin and fatty acids as in talloel; or a sodium, potassium or ammonium neutralized soap of these materials. In general, the soaps appear to be slightly preferable. They may be either fed in presaponified form or the acidic material may be fed along with the saponifier and neutralization carried out in situ.

For most purposes, talloel sodium soap has been found highly satisfactory, and because of its low cost and relative availability it is perhaps preferable. The amount required will vary with the nature of the feed and the reagents. In general, from about 0.25 to about 5.0 pounds per ton of talloel sodium soap or its equivalent of other materials will be found to be satisfactory. In most cases, this range may be shortened to about 0.5 to 1.0 pound per ton which will take care of all but exceptional circumstances.

Where time and apparatus is available, a pre-conditioning of the ore pulp with the reagents as shown in the accompanying drawing is generally of advantage. However, the reagents may be added to the flotation cell if necessary. In adding the anionic reagent directly to the flotation cell, stage-addition is preferable to using the total quantity as a single unit.

It is usually well to subject the concentrate to a cleaner flotation and if so desired one or more recleaner flotations. Small amounts of middlings are obtained. These latter may be recycled in whole or in part as may be desired, or they may be discarded. Even when discarding these middlings, cleaning is usually worthwhile because of the improvement made thereby in the physical state and grade of the eventual titanium-bearing concentrate.

Having pre-conditioned the pulp, when possible; subjected it to flotation; and collected the resultant bulk concentrate; the latter will generally be found to be sufficiently free from silica and silicates to meet industrial specifications. However, the cleaned bulk float concentrate will be found to have combined with the titanium-bearing minerals, the major portion of any phosphate minerals in the original ore. If these are in excess of about 0.10% $P_2O_5$, a further beneficiation step is necessary. Particularly with ores found in the United States, this will be true of many of the bulk concentrates so obtained.

It is with this reduction in $P_2O_5$ content that the second flotation step of this process of the present invention is concerned. In accordance with the present invention, separation of apatite, for example, from metallic oxides such as ilmenite and the like is made by conditioning the bulk flotation concentrate with a group of reagents which overcome the effect of the promoter on the previously-floated ilmenite and prevent its flotation during the subsequent concentration of the apatite with an anionic promoter for the apatite.

The deactivators for the ilmenite may be selected from any of several materials. In general, it has been found that successful results are readily obtained using a water-soluble silicate and an alkali such as caustic soda. Usually, the amount of silicate required will vary from about 1 to 3 pounds per ton of feed. The amount of caustic required will usually vary from between about 0.1 to 0.5 pound per ton.

Potassium or ammonium hydroxide may be substituted for the caustic soda. Lime or magnesium hydroxides are not useful. Other depressants may be used if so desired. It has been found to be an advantage of the process that it makes little difference whether these agents are incorporated into the pulp in a conditioning operation at a high solids content or at flotation density. The time of conditioning will depend on the characteristics of the particular ilmenite-apatite concentrates being treated. Usually not more than 10 minutes is required.

Either concurrently with or subsequently to this operation, the anionic promoter for the apatite is added. This anionic promoter may be of the same type used in the bulk float, or it may be different. While it is generally preferable that the promoter used in obtaining the bulk concentrate be presaponified, this is not a particular consideration in the phosphate separation. Probably a part of the alkali used in depressing the titanium minerals serves to partially saponify the anionic reagent, if the latter is added in a non-saponified form. Because the amount of material to be concentrated is less usually only about ¼ to ½ the amount of anionic agent required for the bulk flotation need be used. Where conditioning with both the depressant and the promoter is impractical, the latter may be stage-added directly to the apatite flotation in two or three stages to obtain substantially comparable results. The reagent consumption, however, may be somewhat higher.

The conditioned pulp, after being reduced to flotation density, if conditioned at high solids, is subjected to flotation, the promoter being stage-added during flotation, if not added during the conditioning step. The apatite, or phosphorus-bearing concentrate obtained will be particularly low in titanium mineral content, and the tailing will be found to be particularly low in $P_2O_5$ assay, being well below the usual 0.10% requirement.

The apatite concentrate may be given one or more cleaner flotations to obtain a clean saleable apatite concentrate. The tailings from the cleaner operations may be discarded if so desired, but usually contain enough titanium mineral to warrant their being recycled to the grinding operation which preceded the recovery of the bulk concentrate.

The titanium mineral tailing may be used as obtained. However, as shown in the drawing, it is well to pass it through a scavenger flotation, to even out any possible irregularities in the operation of the apatite flotation. The concentrates from this operation, if any, are passed directly to the apatite cleaner flotation. The tailings from the apatite flotation, or from the scavenger float where one is used, are found to be in an excellently dispersed condition so they may be readily deslimed, dewatered, and dried by any conventional means to give a highly satisfactory ilmenite concentrate.

The invention will be illustrated in conjunction with the following example which is intended as illustrative only, and not by way of limitation. All parts are by weight unless otherwise designated.

*Example*

A sample of nelsonite ore, containing ilmenite, magnetite, hematite, rutile, apatite, silica and silicates, was crushed to minus 10 mesh, pulped with water, and agitated, in a Fagergren flotation cell with the air inlet closed, in the presence of about 0.5 pound per ton of sodium silicate. This pulp was deslimed by hydraulic classification producing primary slimes (pri. slime) and sands. The sands were ground to minus 65 mesh in the presence of about 0.6 pound per ton of sodium silicate. The ground pulp was then deslimed to remove the secondary slimes (Sec. slime). The residual treated ore was conditioned with about 1.0 pound per ton of talloel sodium soap, diluted to about 20% solids and subjected to froth flotation in a Fagergren flotation cell to obtain a rougher concentrate and a rougher tailing (rgh. tail.). This rougher concentrate was cleaned once to obtain a clean concentrate and a clean tailing (cl. tail.). This cleaned concentrate was conditioned at flotation pulp density for seven minutes with 1.20 pounds per ton of sodium silicate and 0.30 pound per ton of sodium hydroxide after which the pulp was subjected to flotation a rougher an apatite concentrate was floated off with about one pound per ton of talloel sodium soap stage-added in three stages. The rougher apatite concentrate was cleaned once without additional reagents to obtain a clean apatite concentrate (cl. ap. ct.) and a clean apatite tailing (cl. ap. tail.). The tailing after the rougher apatite concentrate was removed was deslimed to obtain a sands product constituting the ilmenite concentrate (ilm. ct. (sand)) and a slimes product (ilm. ct. (slime)). Typical metallurgical results are shown in the following table in which each of the products is designated by the notations appearing above in parentheses.

Table

| Product | Per Cent Wt. | Assay | | Per Cent Distribution | |
|---|---|---|---|---|---|
| | | Per Cent $TiO_2$ | Per Cent $P_2O_5$ | $TiO_2$ | $P_2O_5$ |
| Cl. Ap. Ct | 8.28 | 1.74 | 39.95 | 0.9 | 49.5 |
| Cl. Ap. Tail | 1.07 | 42.70 | 1.47 | 2.8 | 0.2 |
| Ilm. Ct. (Sand) | 21.27 | 47.36 | 0.06 | 62.2 | 0.2 |
| Ilm. Ct. (Slime) | 0.62 | 40.96 | 0.21 | 1.6 | |
| Cl. Tail | 10.43 | 24.17 | 10.39 | 15.6 | 16.2 |
| Rgh. Tail | 10.29 | 7.79 | 1.55 | 5.0 | 2.4 |
| Sec. Slime | 10.52 | 13.71 | 7.13 | 8.9 | 11.2 |
| Pri. Slime | 37.52 | 1.34 | 3.61 | 3.0 | 20.3 |
| Calc. Head | 100.00 | 16.20 | 6.69 | 100.0 | 100.0 |

It will be noted that by the procedure outlined in the example, an ilmenite product containing only 0.06% $P_2O_5$, well within specifications, was obtained. Even without the final desliming step on the ilmenite product (tailing) from the apatite float, the $P_2O_5$ content is only 0.064%. The cleaned bulk concentrate from the first flotation operation assayed 10.68% $P_2O_5$ and this was reduced to 0.064% in the apatite flotation step. In other words, 99.58% removal of the apatite was obtained in the retreatment of the cleaned bulk concentrate obtained in the first flotation operation.

It is to be noted that the small amounts of rutile, magnetite and hematite occurring in this nelsonite ore were recovered with the ilmenite.

I claim:

1. In the concentration by froth flotation of titanium-bearing oxide minerals from mixtures thereof containing phosphorus-bearing minerals and silica-bearing gangue, the improved process which comprises the steps of preparing an aqueous pulp of the mixture substantially free from slimes in which the particle size is suitable for flotation feed; subjecting the pulp to froth flotation in the presence of a promoter selected from the group consisting of the higher aliphatic fatty acids, talloel, resin acids, naphthenic acids mixtures of these materials, and their sodium, potassium and ammonium soaps whereby a bulk concentrate is obtained; subjecting an aqueous pulp of the bulk concentrate to agitation in the presence of about 1 to 3 pounds per ton of a soluble alkali metal silicate and about 0.1 to 0.5 pound per ton of an alkali selected from the group consisting of sodium, potassium and ammonium hydroxide; subjecting the conditioned bulk concentrate to froth flotation in the presence of a promoter removing the resultant phosphorus-bearing minerals flotation concentrate and collecting the residual tailing as a titanium-bearing oxide minerals concentrate.

2. A process according to claim 1 in which the residual titanium-bearing oxide minerals concentrate is deslimed.

3. In the concentration by froth flotation of titanium-bearing oxide minerals from mixtures thereof containing apatite and silica-bearing gangue, the improved process which comprises the steps of preparing an aqueous pulp of the mixture substantially free from slimes in which the particle size is suitable for flotation feed; subjecting the pulp to froth flotation in the presence of a promoter selected from the group consisting of the higher aliphatic fatty acids, talloel, resin acids, naphthenic acids, mixtures of these materials, and their sodium, potassium and ammonium soaps whereby a bulk concentrate is obtained; subjecting an aqueous pulp of the bulk concentrate to agitation in the presence of about 1 to 3 pounds per ton of a soluble alkali metal silicate and about 0.1 to 0.5 pound per ton of an alkali selected from the group consisting of sodium, potassium and ammonium hydroxide; and subjecting the conditioned bulk concentrate to froth flotation in the presence of a promoter collecting the resultant apatite flotation concentrate and collecting the residual tailing as a titanium-bearing oxide minerals concentrate.

4. A process according to claim 3 in which the residual titanium-bearing oxide minerals concentrate is deslimed.

5. In the concentration by froth flotation of ilmenite from mixtures thereof containing apatite and silica-bearing gangue, the improved process which comprises the steps of preparing an aqueous pulp of the mixture substantially free from slimes in which the particle size is suitable for flotation feed; subjecting the pulp to froth flotation in the presence of a promoter, selected from the group consisting of the higher aliphatic fatty acids, talloel, resin acids, naphthenic acids, mixtures of these materials, and their sodium, potassium and ammonium soaps whereby a bulk concentrate is obtained; subjecting an aqueous pulp of the bulk concentrate to agitation in the presence of producing primary slimes (pri. slime) and sands an alkali selected from the group consisting of sodium, potassium and ammonium hydroxide; subjecting the conditioned bulk concentrate to froth flotation in the presence of a promoter collecting the resultant apatite flotation concentrate and collecting the residual tailing as an ilmenite concentrate.

6. A process according to claim 5 in which the ilmenite concentrate is deslimed.

SAMUEL P. MOYER.

REFERENCES CITED

The following references are of record in the file of this patent:

UNITED STATES PATENTS

| Number | Name | Date |
|---|---|---|
| 2,387,856 | Pickens | Oct. 30, 1945 |

OTHER REFERENCES

Bureau of Mines, Reports of Investigations No. 3328, pages 124–130; No. 3425, pages 89 to 91; and No. 3473, pages 35 to 36.

Certificate of Correction

Patent No. 2,494,139 January 10, 1950

SAMUEL P. MOYER

It is hereby certified that errors appear in the printed specification of the above numbered patent requiring correction as follows:

Column 6, lines 49 and 50, strike out "producing primary slimes (pri. slime) and sands" and insert instead *about 1 to 3 pounds per ton of a soluble alkali metal silicate and about 0.1 to 0.5 pounds per ton of*; line 54, after the word "promoter" insert , *selected from the same group specified above,*; and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*